United States Patent
Gonin

(10) Patent No.: US 8,474,900 B2
(45) Date of Patent: Jul. 2, 2013

(54) MOTOR VEHICLE FRONT TRANSVERSE BEAM COMPRISING A REAR FAIRING ELEMENT

(75) Inventor: Vincent Gonin, St Cyr sur Loire (FR)

(73) Assignee: Faurecia Bloc Avant, Nanterre (FR)

( * ) Notice: Subject to any disclaimer, the term of this patent is extended or adjusted under 35 U.S.C. 154(b) by 279 days.

(21) Appl. No.: 12/926,328

(22) Filed: Nov. 10, 2010

(65) Prior Publication Data
US 2011/0109123 A1 May 12, 2011

(30) Foreign Application Priority Data
Nov. 12, 2009 (FR) ...................................... 09 57967

(51) Int. Cl.
*B60K 11/08* (2006.01)
(52) U.S. Cl.
USPC .......................... 296/180.1; 293/117; D12/169
(58) Field of Classification Search
USPC ............... 180/68.1, 68.3, 68.6, 903; 293/113, 293/115, 117, 120, 121; 296/180.1; 454/141; D12/163, 167, 169, 170, 171, 172, 216
See application file for complete search history.

(56) References Cited

U.S. PATENT DOCUMENTS

| | | | | | |
|---|---|---|---|---|---|
| 2,193,229 | A | * | 3/1940 | Exner | 293/113 |
| D146,893 | S | * | 6/1947 | Bannister | D12/171 |
| 3,789,944 | A | * | 2/1974 | Barenyi | 180/68.6 |
| D243,323 | S | * | 2/1977 | Waldsmith | D12/169 |
| 4,289,096 | A | * | 9/1981 | Latham et al. | 123/198 E |
| 4,391,464 | A | * | 7/1983 | Masotti et al. | 293/120 |
| 4,598,786 | A | * | 7/1986 | Kirchweger | 180/68.1 |
| 4,938,303 | A | * | 7/1990 | Schaal et al. | 180/68.1 |
| 5,046,550 | A | * | 9/1991 | Boll et al. | 165/41 |
| 5,833,283 | A | * | 11/1998 | Shaw | 293/117 |
| 7,013,951 | B2 | * | 3/2006 | Bauer et al. | 165/41 |
| 7,625,036 | B2 | * | 12/2009 | Cormier et al. | 296/187.03 |
| 7,628,444 | B2 | * | 12/2009 | Cormier et al. | 296/187.03 |
| 7,896,409 | B2 | * | 3/2011 | Abdelnour et al. | 293/115 |
| 2007/0257497 | A1 | * | 11/2007 | Heatherington et al. | 293/120 |
| 2008/0017138 | A1 | * | 1/2008 | Rogg | 123/41.05 |
| 2010/0243351 | A1 | * | 9/2010 | Sakai | 180/68.1 |

FOREIGN PATENT DOCUMENTS

| | | | |
|---|---|---|---|
| DE | 3600190 A1 | * | 7/1986 |
| DE | 3630646 C1 | * | 7/1987 |
| DE | 3630645 A1 | * | 3/1988 |
| DE | 4001447 C1 | * | 12/1990 |
| DE | 10 2007 019481 | | 11/2008 |
| EP | 0 050 745 | | 5/1982 |
| JP | 58053516 A | * | 3/1983 |
| JP | 02109728 A | * | 4/1990 |
| JP | 04257735 A | * | 9/1992 |
| JP | 2008290605 A | * | 12/2008 |
| WO | WO 2004/087487 | | 10/2004 |
| WO | WO 2009/121446 | | 10/2009 |

* cited by examiner

*Primary Examiner* — Glenn Dayoan
*Assistant Examiner* — Paul Chenevert
(74) *Attorney, Agent, or Firm* — Jacobson Holman PLLC

(57) ABSTRACT

This beam (4) is intended to be located between a shield skin (2) and a front end (6) of a motor vehicle front assembly (1), said beam (4) being designed to deform by absorbing energy in the event of an impact with the shield skin (2), said beam (4) having an approximately planar front face (8). The beam (4) comprises a rear fairing element (10) having a concavity (16) facing the front of the vehicle so as to promote a laminar flow of air from the front face (8) of the beam (4) toward the front end (6) of the front assembly (1) of the motor vehicle.

10 Claims, 4 Drawing Sheets

MOTOR VEHICLE FRONT TRANSVERSE BEAM COMPRISING A REAR FAIRING ELEMENT

CROSS-REFERENCE TO RELATED APPLICATIONS

This application has a priority of France no. 0957967 filed Nov. 12, 2009, hereby incorporated by reference.

FIELD OF THE INVENTION

The present invention relates to a motor vehicle front transverse beam of the type intended to be located between a shield skin (such as a fascia panel) including air openings and a front end of a motor vehicle front assembly, said beam being designed to deform by absorbing energy in the event of an impact with the shield skin, said beam having a substantially planar front face.

The invention also relates to a motor vehicle front assembly comprising such a front transverse beam.

The function of a motor vehicle front beam is to protect the motor vehicle from the intrusion of external rigid elements, such as a post or another vehicle, into the inside of the vehicle body in the event of an impact with the front of the vehicle, and thus to protect the occupants of the vehicle and the functional elements located in the front part of the vehicle. A beam of this kind also protects pedestrians in the event of a collision between the vehicle and a pedestrian, by providing between the beam and the front of the vehicle an element for absorbing energy resulting from an impact.

A beam of this kind is located in front of a front end of the motor vehicle containing functional elements of the vehicle such as functional members of a system for cooling the propulsion unit of the vehicle and/or an air-conditioning system, such as one or more radiators or a motorized fan unit. These members function by collecting air from outside the vehicle when the vehicle is moving. In addition, the collected air cools the various functional elements of the vehicle.

It is known to design the external front face of the motor vehicle so as to optimize the aerodynamics of the vehicle and improve its air resistance performance while providing air inlets for collecting the air necessary for the above-described functional members to function.

However, the front beam generally has a rectangular cross section which does not promote a good flow of air inside the vehicle front assembly. Thus, while a large amount of work has been carried out to improve the flow of air outside the vehicle, nothing has been provided to optimize this flow inside the vehicle.

BRIEF SUMMARY OF THE INVENTION

One of the aims of the invention is to alleviate this drawback by providing a motor vehicle front beam that improves the flow of air inside the vehicle and thus improves the efficiency of the collection of air and the cooling of the functional members of the vehicle.

To this end, the invention relates to a front transverse beam of the type described hereinabove, said beam comprising:
 a rear fairing element having a concavity turned towards the front of the vehicle so as to promote a laminar flow of air from the front face of the beam toward the front end of the front assembly of the motor vehicle.

A front beam of this kind reduces the turbulence, created by the beam, in the flow of air, thereby improving the cooling afforded by the air collected as the vehicle moves. An improvement of this kind enables to reduce the surface area of the air inlets at the front of the vehicle, thus affording the possibility of further improving the aerodynamics of the motor vehicle, thereby leading to energy savings.

According to other features of the front transverse beam:
 the fairing element is a separate part from the front transverse beam, the fairing element and the beam comprising reciprocal securing means;
 the beam comprises at least one tab which snap-fastens into at least one slot in the fairing element;
 the fairing element is formed by a plastic profiled element, said profiled element being designed to bend in on itself in order to form the fairing element of closed section;
 the fairing element comprises at least one tongue connected to the profiled element by a bending hinge, said tongue bending toward the rest of the profiled element so as to form the concavity;
 the fairing element comprises two tongues, each tongue being connected to the profiled element by a bending hinge, the tongues being bent toward one another in order to form the concavity, each tongue being provided with means for securing to the other tongue;
 the fairing element is formed integrally with the front transverse beam;
 the beam comprises a flexible element for absorbing energy resulting from an impact, said element being located between the front face of the transverse beam and the fairing element;
 the concavity has a rounded, teardrop or V shape.

The invention also relates to a motor vehicle front assembly comprising at least one shield skin and a front end, comprising functional elements of the motor vehicle, located behind the shield skin and in which a front transverse beam as described hereinabove is located between the shield skin and the front end.

According to another feature of the front assembly, the front transverse beam and the shield skin comprise reciprocal fixing means.

BRIEF DESCRIPTION OF THE DRAWINGS

Further aspects and advantages of the invention will become apparent on reading the following description, given by way of example and with reference to the appended drawings, in which.

DETAILED DESCRIPTION OF THE INVENTION

In the following text, orientation terms such as "longitudinal", "transverse", "front", "rear", "above", "below", etc., are to be understood by reference to the usual orientation of motor vehicles, illustrated in FIG. 1 by the arrow S directed horizontally toward the front in the longitudinal direction of the motor vehicle.

Figure 1:
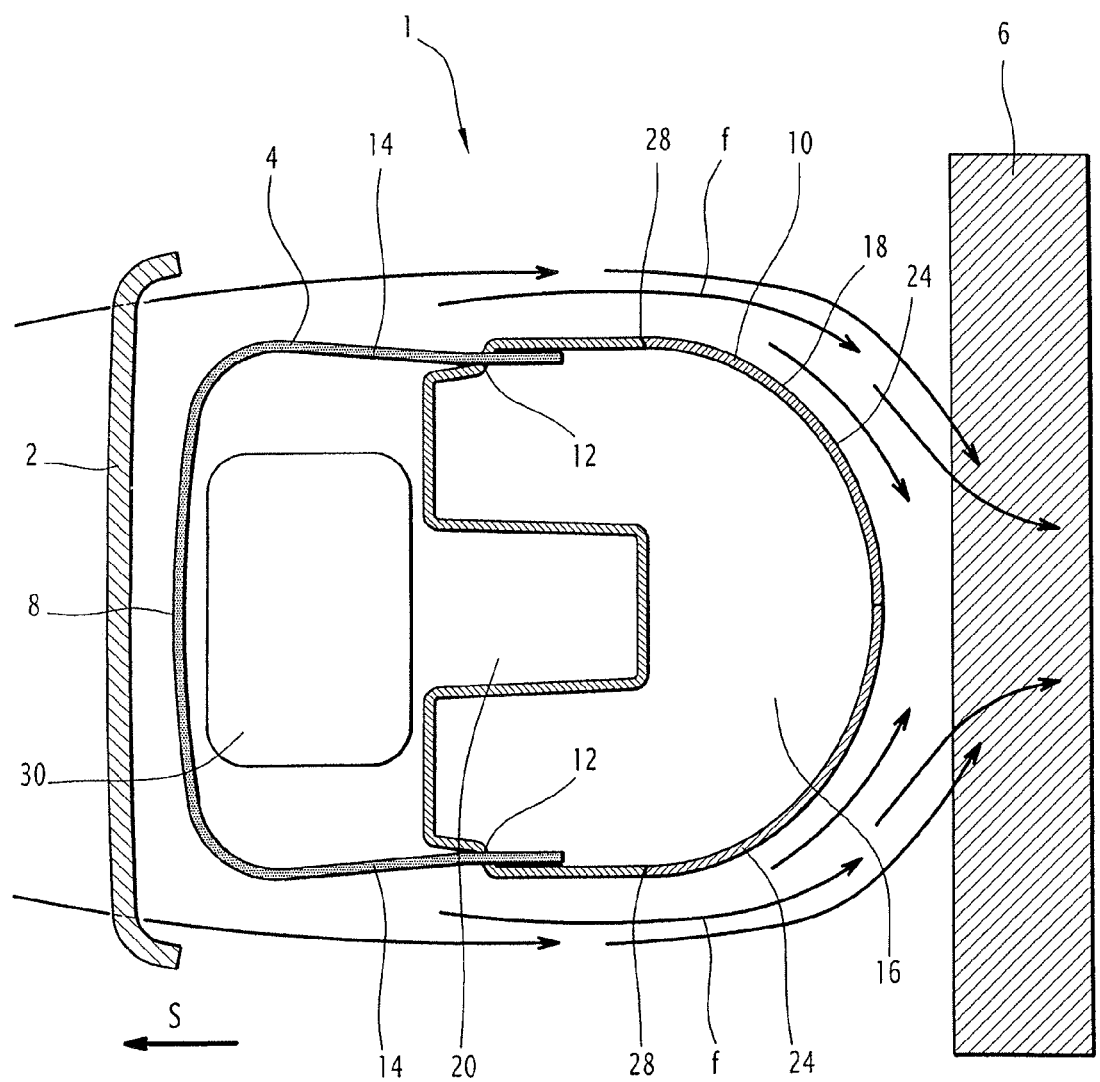
FIG. 1 is a schematic representation in cross section of a front assembly according to the invention, comprising a front transverse beam according to a first embodiment of the invention.

With reference to FIG. 1, a motor vehicle front assembly 1 is described, comprising, from front to rear, a shield skin 2, a front transverse beam 4 and a front end 6 containing functional elements (not shown) of the motor vehicle. The shield skin 2 and the front end 6 are usual elements of a motor vehicle and will not be described in detail.

The front transverse beam 4 is intended to extend in a transverse direction between the shield skin 2 and the front end 6 in a known and conventional manner. The front transverse beam 4 has a front face 8 located facing the shield skin 2 and a rear fairing element 10 extending, in the longitudinal direction, behind the front face 8 of the beam 4 and facing the front end 6. The fairing element 10 extends in the transverse direction approximately over the entire length of the front transverse beam 4.

According to the embodiments shown in the figures, the fairing element 10 is a separate part from the front transverse beam 4 and is fixed to the latter by fixing means 12 (described hereinbelow). According to these embodiments, the transverse beam 4 is, for example, made of metal in a conventional manner. According to a variant, the transverse beam 4 is made of plastic. According to yet another embodiment, the transverse beam 4 is made of plastic and the fairing element 12 is made integrally with said beam 4.

According to the embodiments shown in the figures, the front transverse beam 4 has a U-shaped cross section open toward the rear, such that the front face 8 is approximately planar. The arms of the U of the beam 4 form tabs 14, which are introduced into slots 12 in the fairing element 10 so as to fix the fairing element 10 to the beam 4, the tabs 14 and the slots 12 forming reciprocal fixing means for the fairing element 10 on the beam 4. According to the embodiment shown in FIG. 2, the tabs 14 each have an indentation 16 bringing the tabs toward one another so as to form a means of locking the tabs 14 in the slots 12 of the fairing element 10.

According to a variant which is not shown, the transverse beam 4 has a closed section and the fairing element 10 is fixed to said beam by other fixing means, such as welding, adhesive bonding, housings provided in the beam, inter alia.

Figure 2:
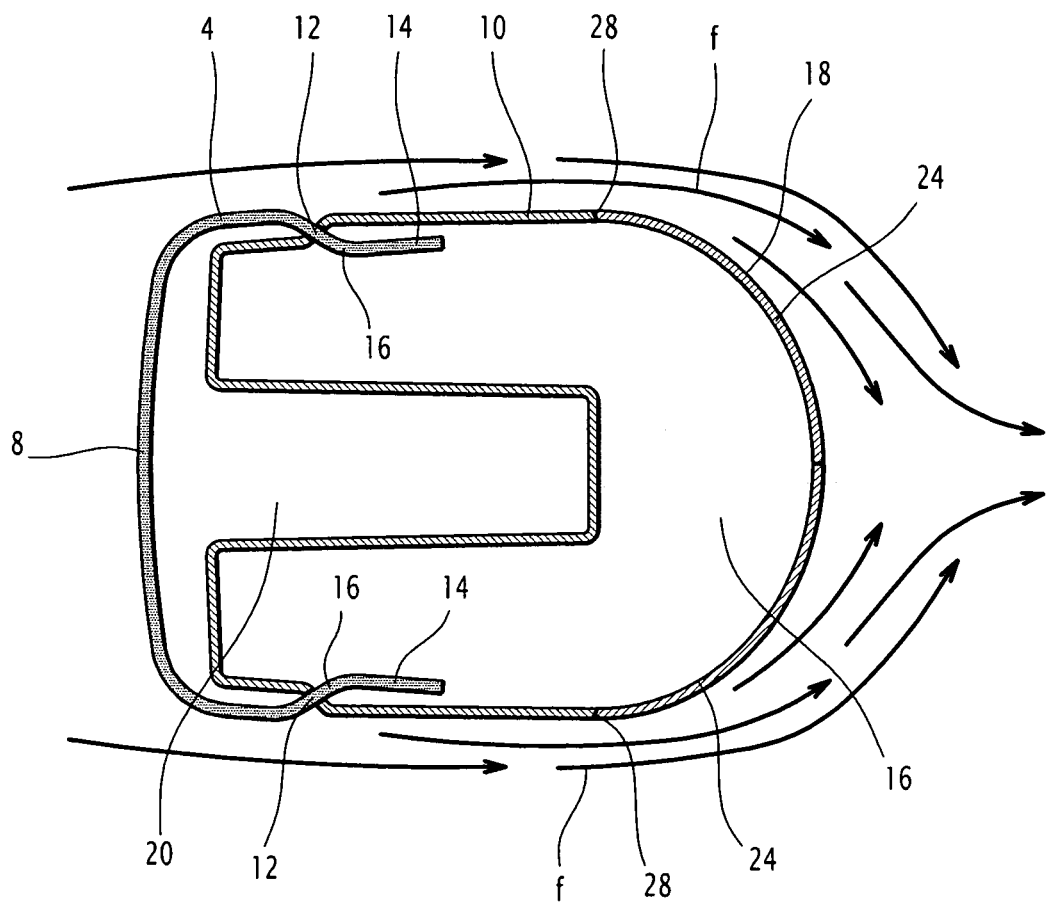
FIG. 2 is a schematic representation in cross section of a front transverse beam according to a second embodiment of the invention.
Figure 4:
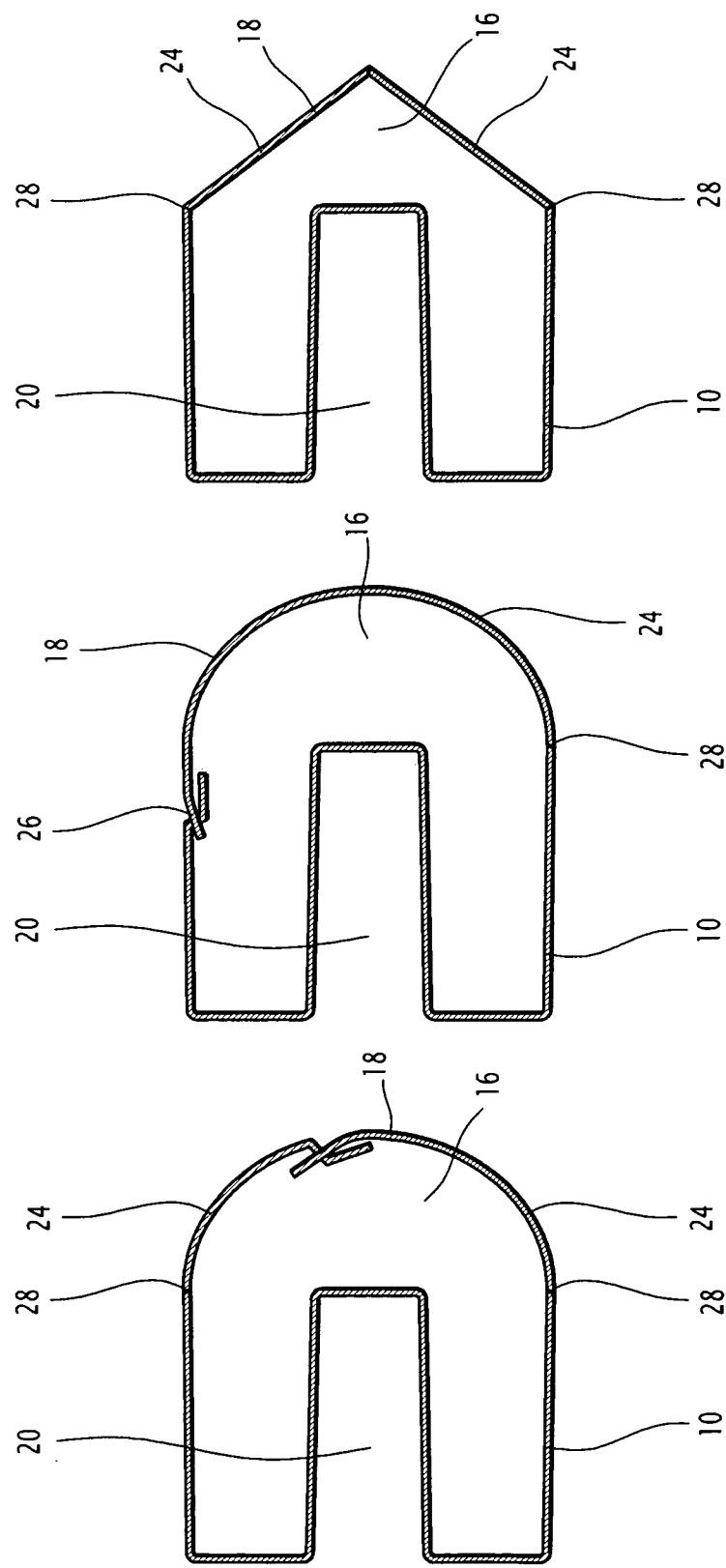
FIG. 4 shows a plurality of sections in cross section of fairing elements according to variant embodiments of a front transverse beam according to the invention.

The fairing element 10 comprises a concavity 16 turned toward the front of the vehicle, thereby giving the fairing element 10 a form that promotes a laminar flow of air from the front face 8 of the beam 4 toward the front end 6 of the motor vehicle, as shown by the arrows f in FIGS. 1 and 2. Specifically, the concavity 16 gives the outer face 18 of the fairing element 10 a form that is profiled toward the rear, promoting a flow of air toward the front end 6 of the vehicle without any turbulence. The concavity 16 may have any form suitable for improving the flow of air inside the front assembly 1. Thus, by way of example, FIG. 4 shows embodiments of the fairing element 10 in which the concavity has a form which is rounded in a circular arc, in a teardrop shape or else has a V-shape (or is in the form of a chevron). Other forms of concavity can be envisioned.

When it is produced as a part separate from the rest of the front transverse beam 4, the fairing element comprises a recess 20 facing the front face 8 of the transverse beam 4. Such a recess gives the beam improved flexural inertia in the longitudinal direction, thereby improving its behavior in the event of the intrusion of an external element into the front assembly. Such a recess 20 also promotes crumpling of the fairing element 10 in the event of deformation of the front transverse beam 4 in the event of a frontal impact with the motor vehicle, thereby improving the energy absorption properties of the front transverse beam 4.

Figure 3:
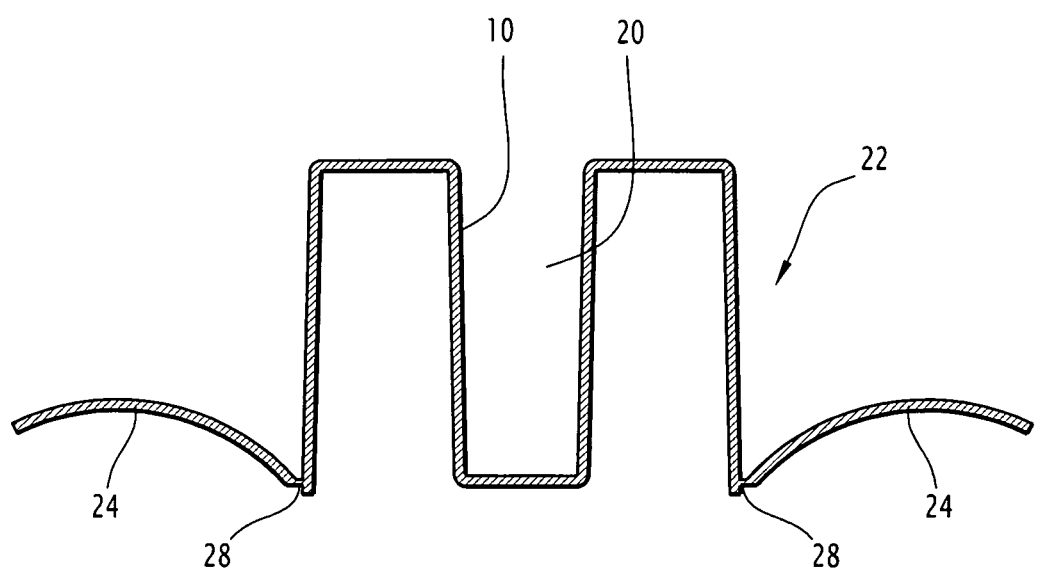
FIG. 3 is a schematic representation in cross section of a profiled element enabling the production of a fairing element of a front transverse beam according to the invention.

Advantageously, the fairing element 10 is formed by an open profiled element 22 that can be produced in one piece, as shown in FIG. 3. A profiled element of this kind comprises at least one tongue 24 able to be folded over the profiled element 22 so as to form the fairing element 10 of closed section. To this end, the tongue 24 and the rest of the profiled element are provided with reciprocal fixing means 26, such as a tab introduced into a slot (see FIG. 4). Alternatively, the tongue 24 may be welded to the rest of the profiled element once it has been folded. In order to enable the bending of the tongue 24, it is connected to the rest of the profiled element by a bending hinge 28 (such as a living hinge), for example obtained by material weakening, as shown in FIG. 3. Thus, the profiled element 22 can be obtained in a very simple and economical manner.

According to the embodiment shown in FIGS. 1 to 3 and in part of FIG. 4, the profiled element 22 comprises two tongues 24 each connected to the profiled element 22 by a bending hinge 28. The tongues 24 are bent toward one another in order to form the concavity 16 and are fixed to one another by reciprocal fixing means (tab introduced into slot) or by welding, for example.

According to another embodiment, the fairing element 10 is produced as two complementary profiled elements fixed to one another by welding or by snap-riveting or snap-fastening, for example.

According to the embodiment shown in FIG. 1, the front transverse beam 4 further comprises a flexible element 30 for absorbing energy resulting from an impact. This element 30 is located between the front face 8 of the beam 4 and the fairing element 10 and makes it possible to protect in a known manner pedestrians in the event of an impact with the shield skin. When the transverse beam 4 is made of metal, the absorption element 30 is a separate element, for example made of expanded foam or injection-molded plastic. When the transverse beam 4 is made of plastic, the absorption element 30 can be integral with said beam 4 in the form of a lattice of ribs, for example. An absorption element 30 of this kind is known and will not be described in more detail here.

The front transverse beam 4 described hereinabove is, for example, an independent element fixed to the shield skin 2 by reciprocal fixing means of any suitable type, for example snap-fastening means, clips or fixing tongues. These fixing means are suitable for keeping the transverse beam 4 in a fixed position with respect to the skin and for generating little noise pollution. These fixing means enable bodywork/engine block continuity in terms of the flow of air inside the front assembly 1. The vertical space requirement of the transverse beam 4 can be approximately identical to that of the shield skin 2, i.e. the shield skin 2 is designed to match the form of the transverse beam 4, as shown in FIG. 1.

According to a variant which is not shown, the transverse beam 4 is integrated into a motor vehicle front shield and is made in one piece with this shield. A shield of this kind is, for example, formed in a known manner from a one-piece frame comprising an upper beam and a lower beam intended to be located facing an upper structure and a lower structure formed by side members of the motor vehicle body, the upper and lower beams being connected by struts which extend vertically and are designed to absorb energy in the event of a frontal impact with the vehicle. The upper beam and/or the lower beam are then transverse beams 4 as described hereinabove.

The transverse beam described hereinabove optimizes the flow of air in the front assembly 1 in a simple and economical manner by reducing the turbulence created by the front transverse beam. Specifically, the form of the fairing element 10 promotes a laminar flow of air around the beam and orients the air optimally toward the front end 6 of the front assembly 1, as shown by the arrows f in FIGS. 1 and 2.

The invention claimed is:

1. Motor vehicle front transverse beam (4) intended to be located between a shield skin (2) and a front end (6) of a motor vehicle front assembly (1), said beam (4) being designed to deform by absorbing energy in the event of an impact with the shield skin (2), said beam (4) having a substantially planar front face (8), characterized in that the beam (4) comprises a rear fairing element (10) having a concavity (16) turned toward the front of the vehicle so as to promote a laminar flow of air from the front face (8) of the beam (4) toward the front end (6) of the front assembly (1) of the motor vehicle, and characterized in that the fairing element (10) is formed by a plastic profiled element (22), said profiled element (22) being designed to bend in on itself in order to form the fairing element (10) of closed section.

2. Transverse beam according to claim 1, characterized in that the fairing element (10) is a separate part from the front transverse beam (4), the fairing element (10) and the beam (4) comprising reciprocal securing means (12, 14).

3. Transverse beam according to claim 2, characterized in that the beam (4) comprises at least one tab (14) which snap-fastens into at least one slot (12) in the fairing element (10).

4. Transverse beam according to claim 1, characterized in that the fairing element (10) comprises at least one tongue (24) connected to the profiled element by a bending hinge (28), said tongue (24) bending toward the rest of the profiled element (22) so as to form the concavity (16).

5. Transverse beam according to claim 4, characterized in that the fairing element (10) comprises two tongues (24), each tongue (24) being connected to the profiled element (22) by a bending hinge (28), the tongues (24) being bent toward one another in order to form the concavity (16), each tongue (24) being provided with means for securing to the other tongue (24).

6. Transverse beam according to claim 1, characterized in that the fairing element (10) is formed integrally with the front transverse beam (4).

7. Transverse beam according to claim 1, characterized in that it the beam comprises a flexible element (30) for absorbing energy resulting from an impact, said element (30) being located between the front face (8) of the transverse beam (4) and the fairing element (10).

8. Transverse beam according to claim 1, characterized in that the concavity (16) has a rounded, teardrop or V shape.

9. Motor vehicle front face assembly (1) comprising at least one shield skin (2) and a front end (6), comprising functional elements of the motor vehicle, located behind the shield skin (2), characterized in that at least one front transverse beam (4) according to claim 1 is located between the shield skin (2) and the front end (6).

10. Motor vehicle front face assembly according to claim 9, characterized in that the front transverse beam (4) and the shield skin (2) comprise reciprocal fixing means.

* * * * *